(12) United States Patent
Thoreau et al.

(10) Patent No.: US 6,393,057 B1
(45) Date of Patent: May 21, 2002

(54) MPEG STREAM SWITCHING PROCESS

(76) Inventors: Dominique Thoreau, 39 rue du Réage, F-35510 Cesson Sévigné; Jean Le Roux, 4 rue Monseigneur Duchesne, F-35000 Rennes; Pierre Ruellou, 15 rue des Coquelicots, F-35410 Domloup, all of (FR)

( * ) Notice: Subject to any disclaimer, the term of this patent is extended or adjusted under 35 U.S.C. 154(b) by 0 days.

(21) Appl. No.: 09/373,696

(22) Filed: Aug. 13, 1999

(30) Foreign Application Priority Data

Aug. 14, 1998 (FR) .............................. 98 10432

(51) Int. Cl.$^7$ .................................................. H04B 1/66
(52) U.S. Cl. .................................................... 375/240
(58) Field of Search ............................ 375/240.01, 240, 375/240.25, 240.23, 240.26, 240.27; 348/384, 400–403.1, 409–416.1; 382/232, 234, 236, 250, 251; H04B 1/66

(56) References Cited

U.S. PATENT DOCUMENTS

| | | | | |
|---|---|---|---|---|
| 5,805,274 A | * | 9/1998 | Kessman et al. | 348/405.1 |
| 5,956,088 A | * | 9/1999 | Shen et al. | 348/384 |
| 6,037,984 A | * | 3/2000 | Isnardi et al. | 348/403.1 |
| 6,091,767 A | * | 7/2000 | Westerman | 375/240 |
| 6,181,711 B1 | * | 1/2001 | Zhang et al. | 370/468 |
| 6,215,824 B1 | * | 4/2001 | Assuncao | 375/240.26 |

OTHER PUBLICATIONS

Al–Mualla et al., Motion field interpolation for temporal error concealment, Vision, Image and Signal Processing, IEE Proceeding, vol.:147. IEEE 2000, pp. 445–453.*
Ismail, M.R. er al., Frame Spreading and an modified priority Scheme for VBR MPEG video transmission in ATM networks, Electrical and Computer Engineering, 1994. Conference on 1994, pp. 526–530.*
Yasude, Y., et al., Packet video transmission through ATM networks, Global Telecommunications Conference, 1989, IEEE, 1989, pp. 876–880.*

* cited by examiner

*Primary Examiner*—Chris Kelley
*Assistant Examiner*—Tung T. Vo
(74) *Attorney, Agent, or Firm*—Joseph S. Tripoli; Ronald H. Kurdyla; Vincent E. Duffy

(57) ABSTRACT

The process is characterized in that the second data stream is modified before transmission, by replacing coding information for the first inter pictures of bidirectional type following the intra picture of the first GOP of the second sequence after the switching point, when considering the order of coding of the pictures, with predefined picture coding information whose coding cost is less than or equal to that of the initial pictures. Applications relate to the transmission and storage of programs, editing, etc.

10 Claims, 1 Drawing Sheet

MPEG STREAM SWITCHING PROCESS

FIELD OF THE INVENTION

The invention relates to a process for the switching of an MPEG stream, for example a stream of video sequences or programme segments coded according to the MPEG standard, the latter standing for the expression Motion Picture Expert Group.

BACKGROUND OF THE INVENTION

Coding according to the MPEG standard calls upon various types of coding of the pictures:
  intra coding (I picture) making no reference to any previous or following picture,
  inter coding of predictive type (P picture) which may call upon a previous reference picture
  inter coding of bidirectional type (B picture) which may call upon a previous reference picture and/or a following reference picture.

The pictures, according to the MPEG standard, are grouped together into GOPs or Groups Of Pictures. The first picture of a GOP is a picture of intra type and the first few pictures of B type which follow may call upon pictures of the same GOP, this then being a closed GOP, or else upon pictures of the same GOP and of the previous GOP, this then being an open GOP.

Films or video sequences are nowadays commonly stored in compressed form, so as to reduce the memory capacity required. Switchings of sequences are then performed not in baseband but directly from the MPEG coded data streams.

Let us consider for example a broadcast of two successive video sequences based on digital data stored in compressed form, a first compressed video data stream corresponding to a first picture sequence and termed the old stream, which is replaced, onwards of a given point termed the switching point, with a second compressed video data stream termed the new stream and corresponding to a second picture sequence. The problem arises when the data stream following the switching point commences with an open GOP. This is because the decoding of the compressed pictures of a first GOP of this second stream may require, if this is an open GOP, the utilization of pictures of a previous GOP. As the previous GOP corresponds to a data stream of another sequence, the decoded pictures corresponding to this open GOP will exhibit defects. These defects are generally highly visible and are due to the utilization, for the decoding of these first few pictures of B type of the second sequence, of a different reference picture from the one which was used for coding. This is because the picture blocks constituting the picture or the pictures of the open GOP which were coded in bidirectional mode are inter-coded picture blocks based on a reference picture of P or I type of the previous GOP for the same picture sequence. The decoding of the inter-coded blocks, blocks composed of information regarding residuals or prediction errors, for the first few pictures of bidirectional type after the switching point, will utilize different blocks from those which served in calculating these inter-coded blocks of residuals. The reference picture taken into account at decoding level is in fact different from the one taken into account at coding level.

Very troublesome block effects consisting in the displaying of erroneous picture blocks will therefore appear on the first few pictures of the second sequence.

A solution to this problem exists and is known to be described in the MPEG II standard (Part 1: Systems, appendix K). It involves incorporating, into the system layer, information relating to the possible switching points (referred to as "splicing points" in the standard) for which the transport stream has favourable characteristics, allowing decoding of the pictures without the abovementioned defects (for example by using closed GOPs). Switching may then be carried out at these points alone. Of course, this information must be incorporated into the data stream right from the time that the pictures are coded and it can no longer be incorporated subsequently other than by carrying out a new decompression and compression of the data.

A permitted switching point, at the start of a GOP, adds a constraint on the coding of the first few pictures of this GOP, which are coded in bidirectional mode, this GOP having to be closed. These pictures may use, as reference pictures, only pictures which follow and can no longer use previous pictures; they are therefore forced into monodirectional mode. This MPEG II coding which is compatible with stream switchings therefore decreases the compression rate and is not normally used for coding films or video sequences. Today, the market contains omly a very small number of products forcing closed GOPs for the switching requirements, the constraints induced in respect of the bit rate regulation at coder level being troublesome. Moreover, a-priori determination of the locations in the data stream at which a closed GOP must exist, that is to say prediction of the locations in the sequence where the cuts will be made, presupposes that the future uses of the sequences are known. Otherwise, it would be necessary to use closed GOPs exclusively.

This solution therefore has several drawbacks:
  reduction in the video data compression rate
  requirement for decoding and recoding in respect of data streams not possessing this compatibility of stream switching at the outset, with all the problems related to restorage, to picture quality etc.

The aim of the invention is to alleviate the aforesaid drawbacks.

SUMMARY OF THE INVENTION

The subject of the invention is an MPEG stream switching process for transmitting a first data stream corresponding to a first video sequence followed, at a given point of switching of this first stream, by a second data stream corresponding to a second video sequence, each sequence being coded according to a GOP (Group Of Pictures) structure, each GOP comprising pictures of intra-coded intra type, of inter-coded predictive type and of inter-coded bidirectional type, each picture coding corresponding to a coding cost dependent on the amount of information to be transmitted in the data stream for the coding of this picture, the switching point being at the level of a GOP, characterized in that the second data stream is modified before transmission, by replacing coding information for the first inter pictures of bidirectional type following the intra picture of the first GOP of the second sequence after the switching point, when considering the order of coding of the pictures, with predefined picture coding information whose coding cost is less than or equal to that of the initial pictures.

The main advantage of the invention is that it allows switching from one video sequence over to another sequence or insertion of one video sequence into another sequence while minimizing the defects which may appear during the switching or switchings. By virtue of the invention, it is possible to utilize MPEG coded data streams which are not compatible with stream switching (open GOPs), and hence optimally compressed video sequences.

The sequence transitions are softened by eliminating the most troublesome picture defects generated by the open GOPs at the start of the new data stream.

The switchings may be performed in a random manner, for example by random access to data stored on magnetic disks, the coded data streams not being subjected to any particular configuring before and after a switching point.

The cost of implementation is minimal since the structure of the transport stream is not modified by the processing, avoiding complex operations of depacketization and repacketization.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawing in which.

DETAILED DESCRIPTION OF PREFERRED EMBODIMENTS

Figure 1:
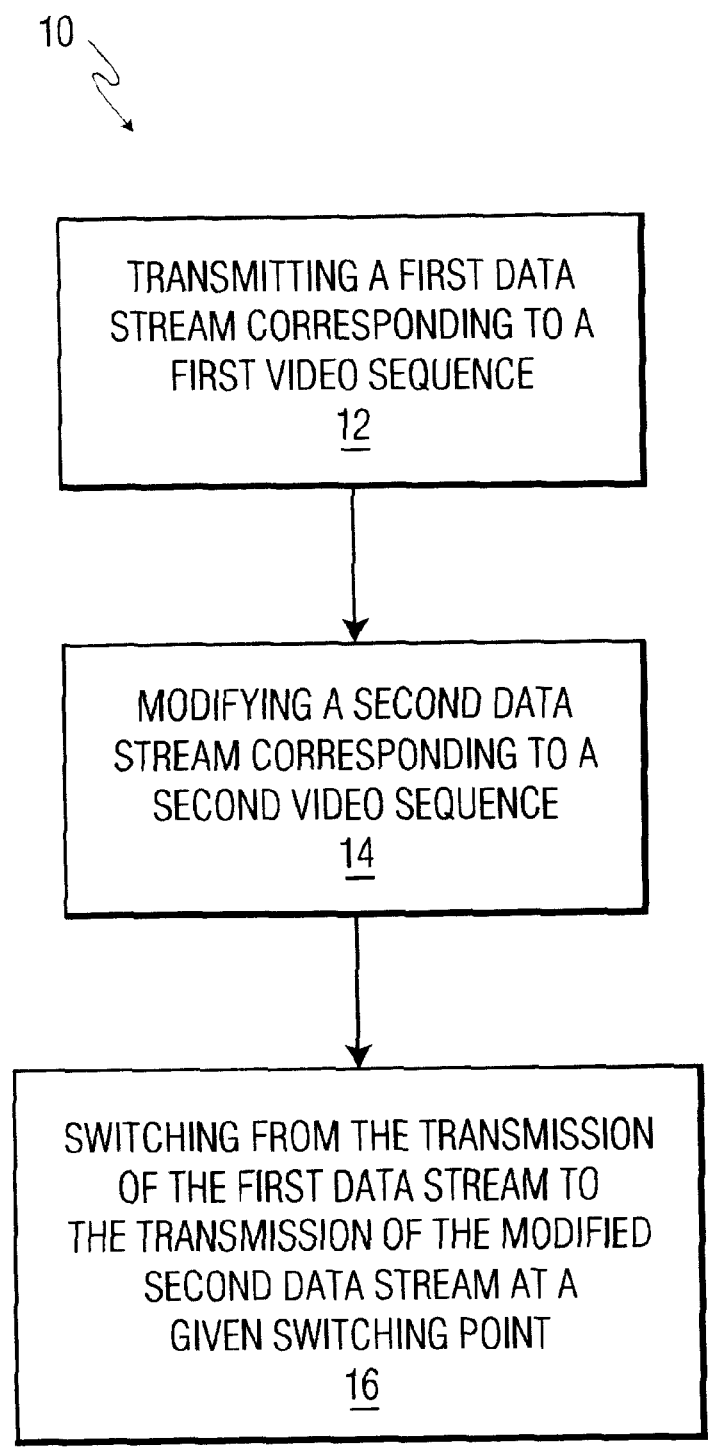
FIG. 1 is a flowchart illustration the MPEG stream switching process of the present invention.

The characteristics and advantages of the present invention will become better apparent from the following description, given by way of example.

Let us consider a switching, during a video transmission, from one video sequence termed sequence 1 over to a second sequence termed sequence 2.

The video sequences utilized are sequences coded according to the MPEG standard. The order of coding or coded order of the pictures, which is also the order in which the pictures at the output of a coder are transmitted and/or the order in which the pictures at the input of a decoder are decoded and stored, differs from the order of display of these decoded pictures because of the bidirectional-coding possibilities.

Let us assume that the two sequences 1 and 2 consist of pictures of I, B, P type, the order of coding of which is as follows:

sequence 1 B1 B1 P1** B1 B1 I1 B1* B1* P1 B1 B1
sequence 2 B2 B2 P2** B2 B2 I2 B2* B2* P2 B2 B2

The picture of intra type (I1, I2) defines the boundary of a new GOP.

The two pictures of bidirectional type which follow the picture of intra type (pictures marked with an asterisk) may make reference to the picture of intra type and to the picture of P type preceding this intra picture (picture marked with two asterisks), and hence belonging to the previous GOP. This choice of reference is made at macroblock level, for which reason the coding of an overall picture may call simultaneously on two references the picture of intra type and the picture of P type.

The switching at GOP level gives the new transmitted sequence composed of sequence 1 up to the boundary of the GOP and then sequence 2:

switched sequence B1 B1 P1** B1 B1 I2 B2* B2* P2 B2 B2

The two pictures B2* of bidirectional type which follow the picture of intra type will make reference, during decoding, to the picture I2 of intra type and to the picture P1 of predictive type. Accordingly, these two pictures cannot be correctly decoded, having lost one of their reference pictures (P2 replaced with P1**).

Let us now consider the two picture sequences coded in the order of display, that is to say after reordering for display.

Sequence 1 B1 B1 P1** B1* B1* I1 B1 B1 P1 . . .
sequence 2 B2 B2 P2** B2* B2* I2 B2 B2 P2 . . .
switched sequence B1 B1 P1** B2* B2* I2 B2 B2 P2 . . .

The decoding of the two pictures B2* of bidirectional type utilizes different reference pictures from those used during coding. This difference in the reference pictures is the source of the defects in display for the pictures B2*.

The coding process according to the invention consists in replacing the pictures B2* which correspond to a coding of prediction error or of residual relative to a reference picture, with pictures having a predetermined configuration, so that the prediction error information contained in the blocks of these pictures of B type is independent of the reference pictures used during decoding.

The new pictures B2* are pre-encoded pictures of inter type, this pre-encoding being independent of the sequences utilized; they are calculated once only and loaded into the equipment used for switching the sequences, as explained later. The only constraint relates to the size of the new pictures B2*, that is to say the data required for coding these pictures, which data will have to replace the coding data for the initial pictures B2* in the MPEG data stream. This size must be less than or equal to the size of the replaced pictures so as to be able to place into the MPEG data stream, instead of the initial data, the new data, supplemented with padding bits or zero values if the size is less.

The various pre-encoding possibilities or coding modes are detailed below and relate equally to the blocks of residuals and to the associated motion vectors.

Coding in inter mode carries out a calculation of error between the picture to be coded and the reconstructed reference picture compensated for motion on the basis of motion vectors, doing so at the level of each block (in fact macroblock) making up the picture to be coded. It is the blocks of residuals or prediction error blocks which constitute, together with the motion vectors, the data for coding the picture in inter mode.

A first pre-encoding possibility consists in forcing the prediction error blocks to zero and the associated motion vectors to zero. In this case, the decoder reconstructs the pictures B2* from one or both reference pictures depending on whether monodirectional or bidirectional coding is involved.

Thus, in accordance with the order of display of the switched sequence—the order indicated above:

if the reference picture is the intra-coded picture I2 (lookahead prediction, zero lookahead motion vectors), this picture is repeated twice before the displaying of the picture I2, if the reference picture is the picture P1 coded in predictive mode (lookback prediction, zero lookback motion vectors), this picture is repeated twice after the displaying of the picture P1. Hence, there is an artificial prolongation, by a duration of two pictures, of the sequence 1, if there are two reference pictures I2 and P1** (bidirectional prediction, zero motion vectors), the two pictures B2* are a blend of the two reference pictures flanking these two pictures B2* making it possible to create a fading effect between the two sequences.

The pictures, for a coding according to the MPEG standard, can be sliced into frames and the four frames making up the two pictures B2* can then be coded differently. For example, the first frame of the first picture (in the order of display) makes reference to the picture P1, the second frame of the first picture makes reference to the picture P1 and I2, the first frame of the second picture makes reference to the picture P1** and I2, the second frame of the second picture makes reference to the picture I2.

A second pre-encoding possibility consists in forcing the prediction error blocks to zero and using non-zero associated motion vectors. In this case, the decoder reconstructs the pictures B2* from one or more reference pictures indicated in the data stream received, but these reference pictures are motion-compensated on the basis of the motion vectors, before being utilized.

The pictures coded in intra mode, according to the MPEG standard, may be accompanied by motion vectors termed concealment motion vectors. These motion vectors are not used for the intra coding and values may be transmitted for any utilization by the decoder. It is therefore entirely possible to code the sequences by allocating to the motion vector fields relating to the pictures of intra type, the motion of this intra picture with respect to a previous reference picture of P type. Such coding of the sequences makes it possible to utilize the field of concealment motion vectors to perform for example an extrapolation, or temporal extension, of this field of vectors for the coding of the replacement pictures.

For example, the data relating to the picture I2 contain the field of concealment motion vectors representing the motion between this picture I2 and the previous picture P2, extrapolations of this field of motion vectors make it possible to allocate a first extrapolated field in respect of the replacement picture for the first picture B2*, a second extrapolated field in respect of the replacement picture for the second picture B2*. It is then possible no longer simply to repeat the picture of intra type, but to carry out motion compensation of this picture of intra type so as to render the switching softer by not resorting to a simple repetition of the picture I2* but by carrying out a lookahead for the motion. The quality of the switching is of course dependent on the quality of the motion vector field utilized.

Thus, in accordance with the order of display of the switched sequence—the order indicated above, if the reference picture is the intra-coded picture I2 (lookahead prediction), the two pictures of bidirectional type B* correspond to this picture I2 motion-compensated and are displayed before the displaying of the picture I2.

Of course, this possibility requires the picture sequences to be coded initially by utilizing the concealment motion vector fields, as indicated earlier.

A third possibility consists quite simply in coding all the blocks of the two pictures of bidirectional type (B2*) in intra mode, for example by coding blue or black colour pictures and thus two blue or black pictures will be displayed between the two sequences. It is also possible to code a picture representing a logo suitable for the new sequence. The picture blocks do not call on any reference picture and the value of these blocks is not zero but contains the information item which it is desired to display.

A transition with completely black or blue pictures is much "cleaner" than a transition exhibiting defects in blocks. The aim is to minimize the visual defects when sequences are strung together and hence to perform soft switching. The pictures in black are not generally detected by the observer, the effect occurring during a very short instant since only the first few pictures of B type of the GOP are involved.

The utilization of non-zero motion vectors also makes it possible to avoid the problems of picture flicker when a solution consisting in the repeating of pictures is chosen.

The use of a field of non-zero motion vectors but which consists of vertical motion vectors, of modulus for example one line spacing of the frame, makes it possible to carry out frame interpolation by shifting it by one pixel and thus limit the flicker.

Moreover, it is possible to decompose the coding of the replacement pictures into a coding of frames constituting these pictures and thus to apply a different mode of prediction to each frame even if the picture sequences are coded in picture rather than frame mode. This is because the decoders switch from one mode to the other as a function of the cues transmitted in the data stream according to the standard and this switching is possible at the level of each picture. In general, any type of prediction provided for in the standard can be utilized for the coding of the replacement pictures.

The choice from among these various solutions and from among the various types of prediction is made as a function of the type of transition desired by the user. The various groups of pictures of B type corresponding to these solutions may be generated once and for all and held in memory. The most suitable picture group from among the set stored will then be called on during switchings. It is also possible to calculate these pictures in real time.

The cost of coding the replacement pictures is low and generally less than the cost of coding the original pictures B2* allowing easy insertion of these new pictures into the MPEG data stream, in place of the original pictures, that is to say avoiding complex manipulations at the overall stream level. The solution chosen will be able to take account of this cost criterion, given that the cost depends inter alia on the motion vectors and the prediction errors.

The transport stream TS consists of data packets of 188 bytes and 16 error correction bytes. The packets corresponding to the pictures B2* are therefore replaced with new packets containing data dependent on the solution adopted for the switching.

Thus, after having chosen a coding solution whose cost is less than the cost of coding the original pictures B2*, the precalculated packets corresponding to the replacement pictures are substituted for the packets relating to these original pictures. Padding packets are used if the number of packets relating to the replacement pictures is less. In this way, the packet structure is not modified, the sequence of packets is not broken since the PCR (Program Clock Reference) information which is located in the header at transport stream (TS) level and is linked with the number of packets remains valid for all the packets. This is because the clock reference can be utilized only for a transmission at fixed bit rate, packets for padding the transport stream compensating for the variation in bit rate during video and audio coding.

The invention may be applied as follows. When switching programme segments, for example from a sequence 1 to a sequence 2, the last section of the sequence 1 and the first section of the modified sequence 2 are stored in an intermediate file. This modification is simply linked with the problems of synchronization, so as to avoid poor alignment of the video and audio frames, and consists for example in interposing data corresponding to the idle times. Next, the specific data corresponding to the payload relating to the first few pictures of B type of the second sequence (the pictures B2* in the example) are replaced, in this intermediate file, with data relating to a group of predefined pictures containing a known structure and chosen for example from a sample of pictures stored for this purpose. Lastly, the data truncated from the first sequence are pasted onto those of the intermediate file, these latter data being themselves pasted onto the data of the second sequence truncated at its start.

Thus, the original files are not modified and can be reused subsequently by utilizing new switching points. Only the temporary file will be destroyed after use.

It is therefore possible to store the sequences separately and in compressed form on servers. It is also possible to use several sources of compressed data, servers, DVD, CD-ROM, etc. type media, real-time MPEG encoders (although the latter are no longer necessary by virtue of the invention) etc., the switching problems being solved in the manner described earlier.

Referring now to FIG. 1, a flowchart broadly illustrating the MPEG switching process of the present invention is shown. Initially, at step 12, a first data stream corresponding to a first video sequence is transmitted. Next, at step 14, a second data stream corresponding to a second video sequence is modified prior to the transmission of the second data stream. The second data stream is modified before transmission by replacing coding information for the first inter pictures of bidirectional type following the intra picture of the first GOP of the second sequence. Afterwards, at step 16, the transmission of the first data stream is switched to the transmission of the modified second data stream at a given switching point.

The examples described above relate to the replacing of two pictures of bidirectional type. The invention is not of course limited to this number and it would be equally possible to envisage the replacing of a larger number of pictures without the process thus implemented departing from the scope of the invention. If, for example, the structure of the GOP is composed of 1 or 3 pictures of bidirectional type instead of two as described earlier, the number of pictures involved in the replacement would be 1 or 3 pictures respectively.

Applications relate to the transmission of programmes consisting of programme segments and equally to the storage of such programmes for example for time-offset transmission, it being possible for the data stream to be transmitted either to storage units or directly to television programme distribution units. They relate to all types of editing operations making it possible to obtain a new binary stream of coded data conforming to the conventions defined by the MPEG standard.

What is claimed is:

1. MPEG stream switching process comprising the steps of transmitting a first data stream corresponding to a first video sequence followed, at a given point of switching of this first stream, by a second data stream corresponding to a second video sequence, each sequence being coded according to a GOP (Group Of Pictures) structure, each GOP comprising pictures of intra-coded intra type, of inter-coded predictive type and of inter-coded bidirectional type, each picture coding corresponding to a coding cost dependent on the amount of information to be transmitted in the data stream for the coding of this picture, the switching point being at the level of a GOP, wherein the second data stream is modified before transmission, by replacing coding information for the first inter pictures of bidirectional type following the intra picture of the first GOP of the second sequence after the switching point, when considering the order of coding of the pictures, with predefined picture coding information whose coding cost is less than or equal to that of the replaced pictures.

2. Switching process according to claim 1, wherein said predefined picture coding information corresponds to an intra coding.

3. Switching process according to claim 1, wherein said predefined picture coding information corresponds to an inter coding of bidirectional type whose prediction error is forced to zero.

4. Process according to claim 3, wherein said predefined picture coding information associated with a picture comprises the coding data for a motion vector field and wherein these data code a field of zero motion vectors.

5. Process according to claim 3, wherein said predefined picture coding information associated with a picture comprises the coding data for a motion vector field and wherein these data code a horizontal motion vector field.

6. Process according to claim 3, wherein a single picture is taken as a reference picture for the inter coding of bidirectional type.

7. Process according to claim 6, wherein said reference picture is the last picture of predictive type P of the first video sequence before the switching point.

8. Process according to claim 6, wherein said reference picture is the first intra picture of the second video sequence after the switching point.

9. Process according to claim 8 for MPEG data stream switching for which the concealment motion vector fields associated with the pictures of intra type of the first and second data streams are calculated, for each field, as a function of the motion between the reference picture preceding the picture of intra type associated with this field and this picture of intra type, by considering the order of coding of the pictures of a sequence, wherein the second data stream is modified, before transmission, by replacing coding information for the motion vector fields of the first pictures of B type, with coding information for the motion vector fields calculated from a temporal interpolation of the concealment motion vector fields associated with the pictures of intra type preceding the first pictures of B type in the order of coding.

10. Process according to claim 1, wherein the relevant pictures in the replacing of coding information are the first two inter pictures of bidirectional type following the intra picture.

\* \* \* \* \*